June 16, 1925.

T. MIDGLEY 1,542,801

TIRE MOLD

Filed March 17, 1923    2 Sheets-Sheet 1

INVENTOR
Thomas Midgley
BY Edward C Taylor
ATTORNEY

June 16, 1925.

T. MIDGLEY

TIRE MOLD 1,542,801

Filed March 17, 1923   2 Sheets-Sheet 2

INVENTOR
Thomas Midgley
BY Edward C. Taylor
ATTORNEY

Patented June 16, 1925.

1,542,801

UNITED STATES PATENT OFFICE.

THOMAS MIDGLEY, OF HAMPDEN, MASSACHUSETTS, ASSIGNOR TO THE FISK RUBBER COMPANY, OF CHICOPEE FALLS, MASSACHUSETTS, A CORPORATION OF MASSACHUSETTS.

TIRE MOLD.

Application filed March 17, 1923. Serial No. 625,728.

*To all whom it may concern:*

Be it known that I, THOMAS MIDGLEY, a citizen of the United States of America, residing at Hampden, in the county of Hampden and State of Massachusetts, have invented certain new and useful Improvements in Tire Molds, of which the following is a specification.

The present invention relates to molds especially designed to permit of their manufacture out of sheet material such as pressed steel. It has for a particular object a mold of this character which is suited for use in the ordinary pot heater, in which the molds are held assembled against the force of internal expansion by a hydraulic ram serving to press together the series of molds located within the heater.

The invention will now be described in connection with the accompanying drawings, in which—

Figure 2:
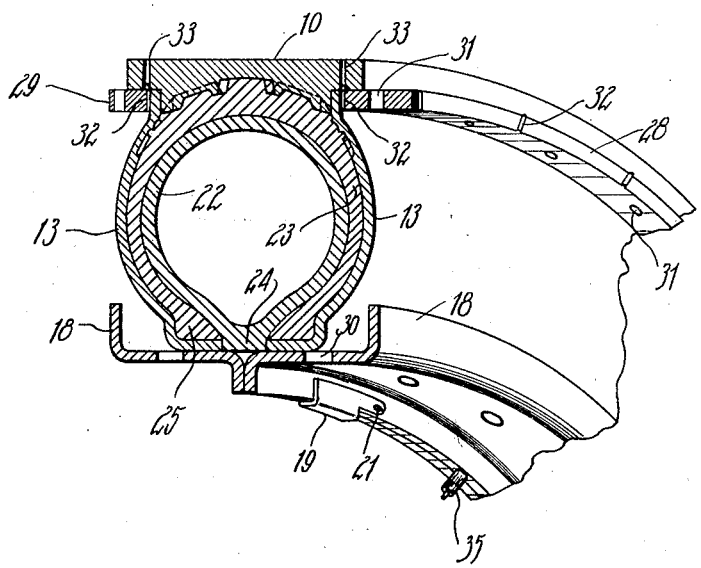
Fig. 2 is a section of one of the molds.
Figure 3:
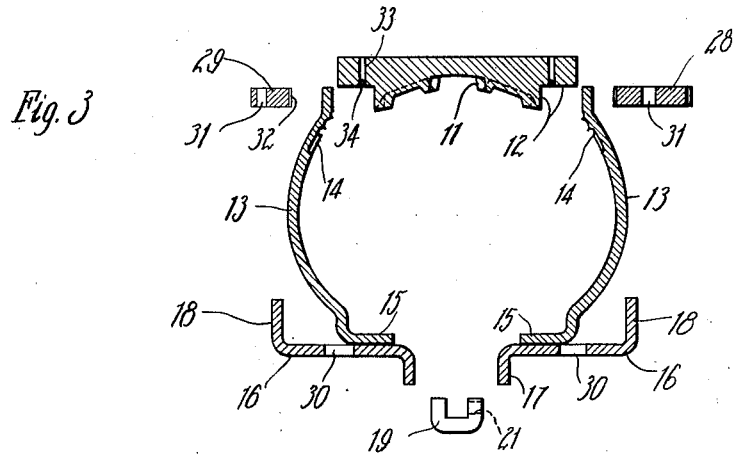
Fig. 3 is a sectional view showing the mold parts separated.
Figure 4:
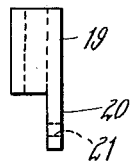
Fig. 4 is a bottom view of a clamp.

The mold itself will first be described with reference to Figs. 2, 3, and 4. Each mold comprises a tread ring 10 preferably in the form of a unitary annulus having its interior surface formed at 11 to the reverse of the tread pattern desired on the tire. This tread ring may be formed with one or more transverse splits held together by suitable clamps to facilitate removal from the vulcanized tire, but it has been found that there is no difficulty in removing a unitary ring from the tire since the tire and the internal annular bag upon which it is cured are both flexible. The unitary construction is therefore preferred, being simpler.

At the sides of the tread ring are shoulders 12 against which the side plates 13 are adapted to fit. These plates are suitably formed to the configuration desired in the tire, and may have a continuation of the tread design formed thereon at 14 together with other designs or lettering. The inner edges of the side plates are bent inwardly at 15, and are spot welded or otherwise secured to annular rings 16 having inwardly and outwardly projecting flanges 17 and 18 respectively. The latter flanges serve as supports adapted to hold adjacent molds in a stack separated. The inwardly projecting flanges 17 are preferably employed to assist in holding the molds assembled while they are being stacked in the heater. This connection does not in the preferred case serve as the holding means for the mold sections during vulcanization, the hydraulic pressure of the heater ram mainly accomplishing this, but is convenient in order to facilitate handling of the mold in assembled condition. A simple way of connecting the flanges 17 together when desired is afforded by a clamp 19 of U-shaped cross-section, and having one side extended at 20 to permit of its being pivoted at 21 to one of the flanges. By rotating this clamp on its pivot the U-shaped portion can be caused to embrace or release the two abutting flanges.

The inwardly bent portions 15 of the side plates serve both for attachment to the rings 16 and to position between them the base of the annular inflatable bag 22 upon which the tire 23 is vulcanized. As appears in Fig. 2 the two portions 15 are spaced apart sufficiently to form, together with the rings 16, a recess into which the base 24 of the bag fits. The beads 25 of the tire rest upon the inturned portions of the side plates, so that by the construction described the base of the annular bag is positively held between and below the beads of the tire.

Figure 1:
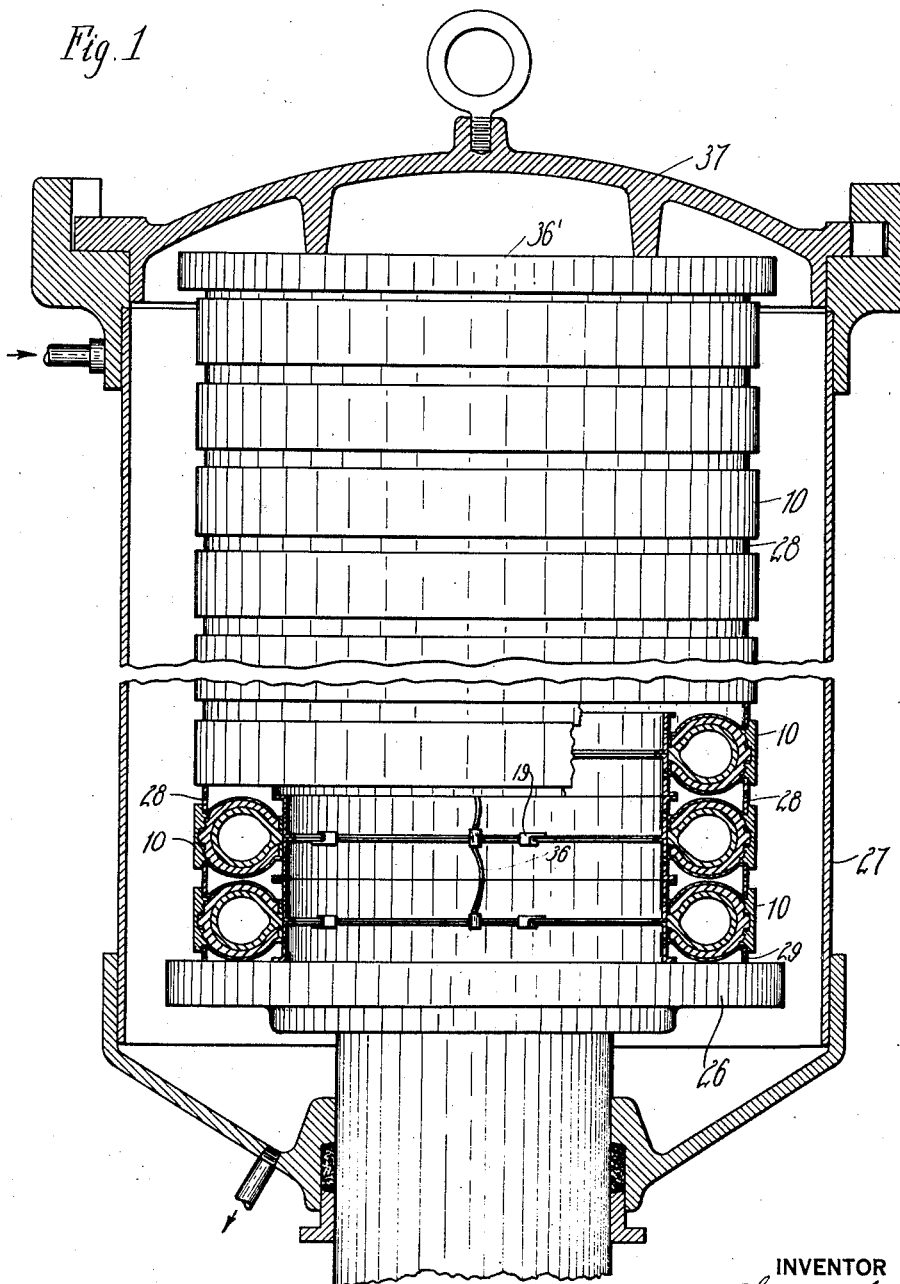
Fig. 1 is a vertical section through a pot heater showing the improved molds in place.

Fig. 1 shows the molds stacked on the ram 26 of the heater, the cylindrical body of which is indicated at 27. It appears from this figure that the molds rest on one another with the flanges 18 in contact. Operating both to keep the molds in proper spacing and to align them axially one with another are rings 28, shown more in detail in Figs. 2 and 3. These rings may be (as shown) made separate from the other mold parts and inserted as the molds are being stacked, or for convenience in handling each ring can be spot welded or otherwise attached to one of the side plates 13. The rings could be, of course, formed integrally with the side plates if desired. The side plates adjacent the bottom of the stack of molds is similarly provided with a ring, but as the ring in this case has support upon the ram 26 rather than on the adjacent mold the ring, indicated in this case as 29, is made shallower. In the normal case the rings 28 extend between the adjacent molds, and fit within the shoulders 12, thus preserving the molds in axial alignment.

Provision is preferably made for permitting circulation, between the stacked molds, of the steam with which the interior of the heater is flooded. For this purpose holes 30 are cut in the rings 16, and holes 31 in the rings 28 and 29. By this means the stream can reach easily all the surface of the mold and as the latter is composed of relatively thin material the tire will be quickly and uniformly heated. Provision is also made for the drainage of any water which might collect due to condensation of steam or the use of water for cooling the molds after vulcanization. In the case of rings 16 the holes 30 conveniently serve this purpose also, being positioned to drain the pocket formed at the junction of plates 13 and rings 16. The pocket formed at the junction of plates 13 and spacing rings 28 and 29 is conveniently drained by holes 32 drilled adjacent the bend in the side plates if these are made integral, and formed as notches in the rings if these are formed separately from the side plates. Holes 33 in the tread ring 10 lead into a channel 34 by which they can communicate with holes 32.

As the molds, with their enclosed tires, are stacked in the heaters the valve stems 35 of the annular bags 22 are connected by pipes 36 to a suitable source of fluid pressure. The molds will automatically align themselves by reason of the interfitting rings 28. A disk 36' is placed on top of the uppermost mold which, as in the case of the lowermost mold, is provided with a narrow ring 29. The ram being raised the stack of molds are held firmly between it and the cover 37, whereby they are kept closed under the influence of the fluid pressure exerted within the bags during vulcanization.

By reason of their construction the molds can be made of much less weight and with thinner walls than the cast molds previously used in connection with vulcanizing presses of this type. The thin side walls, while of ample strength to resist the internal pressure used to force the tires out into the mold, can by this invention be made of a thinness that would not withstand the high transverse compression that is applied to the molds in the vulcanizing press. This pressure is, in molds made according to this invention, received and withstood, not by the side plates, but by the inner and outer peripheral portions of the mold, forming the bead and tread molding portions respectively. These peripheral portions, as will be apparent from the drawings, are suited to receive lateral thrust in a much greater amount than are the side portions of the mold. The construction described both saves labor in handling, and makes the heating of the tire for vulcanization, quicker and more uniform. Changes in the details of construction, made desirable by individual preferences or the design of the tire to be cured, may be made without departing from the invention as set forth in the following claims.

Having thus decribed my invention, I claim:

1. A mold adapted for vulcanizing tire casings comprising a unitary annular tread ring suitably formed to mold the tread portion of the tire, side plates shaped to embrace the side portions of the tire, said side plates being inturned to support the base portions of the tire and to afford between them a space for the reception of the base portion of an annular pressure bag, rings secured to the inturned portions of the side plates adapted to give support to the inner side of the pressure bag, and being bent at their outer edges to form abutments adapted to contact with similar abutments on adjacent molds, flanges on the tread ring adapted to position the side plates, a ring fitting against one of such flanges and adapted to extend between adjacent molds to keep the side plates of both in assembled position, and drainage holes arranged to drain any water pocketed on the mold.

2. A mold adapted for vulcanizing tire casings comprising a unitary annular tread ring suitably formed to mold the tread portion of the tire, side plates shaped to embrace the side portions of the tire, said side plates being inturned to support the base portions of the tire and to afford between them a space for the reception of the base portion of an annular pressure bag, rings secured to the inturned portions of the side plates adapted to give support to the inner side of the pressure bag, and being bent at their outer edges to form abutments adapted to contact with similar abutments on adjacent molds, flanges on the tread ring adapted to position the side plates, and a ring fitting against one of such flanges and adapted to extend between adjacent molds to keep the side plates of both in assembled position.

3. A mold adapted for vulcanizing tire casings comprising a unitary annular tread ring, side plates adapted to abut against the tread ring and to contact with each other at their inner peripheries, clamping means for holding the side rings releasably together, and members adapted to hold the side plates firmly against the tread ring when a stack of molds is compressed in a heater.

4. A mold adapted for vulcanizing tire casings comprising a tread ring, sheet metal side plates separable therefrom, and members adapted to hold the side plates firmly against the tread ring when a stack of molds is compressed in a heater.

5. A mold adapted for vulcanizing tire casings comprising a unitary annular tread ring suitably formed to mold the tread portion of the tire, side plates shaped to embrace the side portions of the tire, said side plates being inturned to support the base portions of the tire, rings secured to the inturned portions of the side plates and bent to form a right-angled flange lying adjacent the outer surface of the side plates, and members interfitting with adjacent molds to keep them stacked and aligned in a heater.

6. A mold adapted for vulcanizing tire casings comprising a unitary annular tread ring, separable side plates, and a ring adapted to couple the mold to an adjacent mold when stacked in a heater.

7. A mold adapted for vulcanizing tire casings comprising a tread ring, separable sheet metal side plates, and sheet metal flanges carried by the side plates, extending sidewise therefrom, and bent over in the direction of the plane of the mold.

8. A mold adapted for vulcanizing tire casings comprising a unitary annular tread ring, separable side plates, a ring adapted to couple the mold to an adjacent mold when stacked in a heater, and a shoulder on the tread ring adapted to centralize the rings to preserve the stacked molds in alignment.

9. A mold adapted for vulcanizing tire casings comprising sheet metal side plates curved to conform to the sides of the tire, flanges secured to the inner periphery of the side plates and adapted to abut similar flanges on adjacent molds to hold each mold closed and to keep adjacent molds separated, and rings adapted to abut against the outer peripheries of the side plates on adjacent molds.

10. In a mold for vulcanizing tire casings, side plates curved to conform to the tire and bent to underlie the tire beads although leaving a space between them for the reception of an air bag, means for coupling the side plates at their outer peripheries, and rings underlying and permanently attached to the side plates and abutting each other to complete the mold at its inner circumference.

11. In a mold for vulcanizing tire casings, sheet metal side plates curved to conform to the tire, means for coupling the side plates at their outer peripheries, means for coupling the side plates at their inner peripheries, and flanges permanently secured to the side plates and adapted to receive the thrust of adjacent molds when the molds are arranged in a stack.

12. In a mold for vulcanizing tire casings, sheet metal side plates curved to conform to the tire; means for coupling the side plates at their outer peripheries; and means for coupling the side plates at their inner peripheries including a pair of rings, one permanently secured to each of the side plates, said rings having abutting flanges parallel to the plane of the mold and spaced flanges also parallel to the plane of the mold and adapted to receive the thrust from adjacent molds when the molds are arranged in a stack.

13. A mold adapted for use in the vulcanization of tire casings, having side plates of substantially uniform thickness, curved to the shape of the tire, and bearing members spaced in part from the side plates but attached thereto and presenting surfaces substantially in line with the widest part of the mold upon which pressure may be applied to hold the mold closed.

14. A mold adapted for use in the vulcanization of tire casings, having side plates of substantially uniform thickness, curved to the shape of the tire, and carrying permanently attached thereto members adapted to contact one with another and support the molds when stacked one over another.

15. In a mold adapted for the vulcanization of automobile tire casings and having side walls of sheet metal curved to conform to the tire, pressure transmitting means adapted to receive lateral thrust and keep the side plates against the tire comprising an annular sheet metal member attached to each side plate and bent over parallel to the central plane of the mold and presenting a bearing surface substantially in line with the widest part of the curved side plates.

THOMAS MIDGLEY.